(No Model.)
A. P. CRAIG.
NUT LOCK.
No. 548,774.   Patented Oct. 29, 1895.
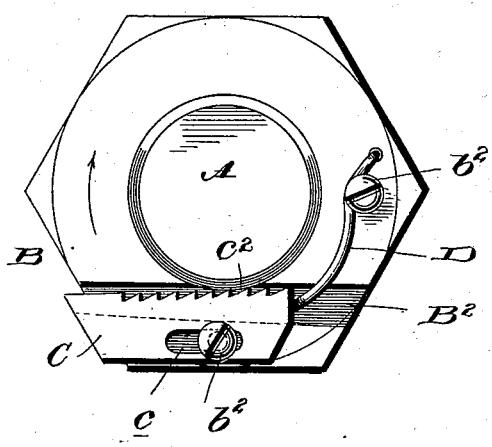
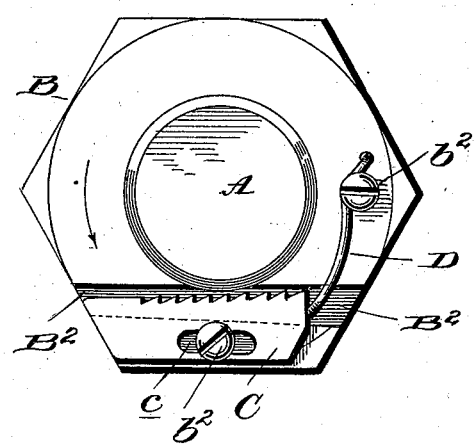
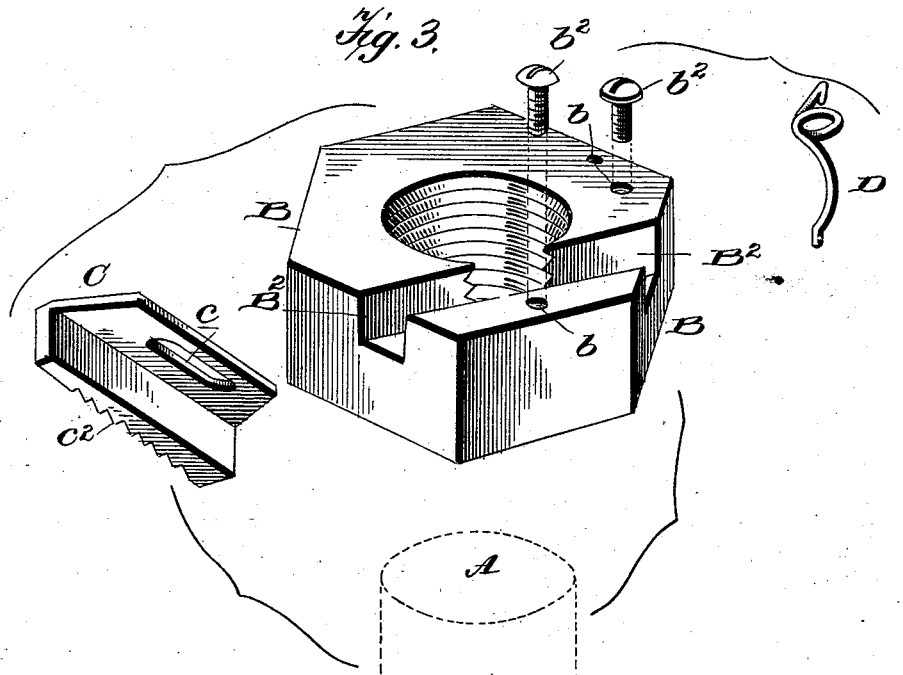
Witnesses
L. C. Hills
Inventor:
Augustus P. Craig
by J. B. Keefer
Atty.

UNITED STATES PATENT OFFICE.

AUGUSTUS P. CRAIG, OF MICHIGAN CITY, ASSIGNOR OF ONE-HALF TO BELLE CRONKHITE, OF COVINGTON, INDIANA.

NUT-LOCK.

SPECIFICATION forming part of Letters Patent No. 548,774, dated October 29, 1895.

Application filed July 27, 1895. Serial No. 557,359. (No model.)

*To all whom it may concern:*

Be it known that I, AUGUSTUS P. CRAIG, of Michigan City, in the county of La Porte and State of Indiana, have invented certain new and useful Improvements in Nut-Locks, of which the following is a specification.

The nature of my invention consists in the construction and arrangement of a device for locking nuts on bolts, as will be hereinafter more fully set forth, reference being first had to the accompanying drawings, in which—

Figure 1 is a plan view of the bolt with nut in locked position thereon. Fig. 2 is a similar view showing the nut in unlocked position, and Fig. 3 is a view of the various parts of my lock-nut in unassembled positions.

In the drawings, A represents the bolt, which is of ordinary construction, B representing my improved lock-nut. This nut B is provided on its front face with a wedge-shaped groove or channel $B^2$ and has also drilled or otherwise formed in its face two or more screw-threaded openings $b$ to be engaged by the screws or pins $b^2$, the purpose of which will hereinafter appear.

C is a dog or wedge which rests and slides in the groove or channel $B^2$ and is formed with an elongated slot $c$, through which the pin or screw $b^2$ passes and retains the wedge in position in the groove, and on its face nearest the screw-thread of the bolt is provided with a series of teeth $c^2$ to engage the screw-threads on the bolt. A spring D is provided for pressing the teeth through the dog C against the said screw-thread of the bolt. This spring is held in place by screws, pins, or other suitable media, (illustrated by the pin $b^2$.)

The operation of the device is as follows: The nut being removed, in order to screw the same on the bolt the procedure is exactly similar to that of screwing an ordinary nut on an ordinary bolt, and the motion being to the right will cause the dog C, through its elongated slot, to give and allow the nut to travel the requisite or desired distance.

In order to unscrew the nut, it is necessary to press the dog C to the right, which throws the teeth $c^2$ out of engagement with the screw-thread, when the nut may be removed with ease. Should an attempt be made to unscrew the nut, however, without disengaging the teeth from the screw-thread, the effect will be to cause the said teeth to jam against the thread and prevent the same from moving in an unscrewing direction.

By the employment of my device I am enabled in a cheap and simple manner to securely lock a nut against displacement, and the construction being so simple liability to derangement of the parts is reduced to a minimum.

Having thus described my invention, I desire to state in conclusion that I do not wish to be understood as limiting myself to the precise construction shown in the drawings, but,

What I claim as new herein, and desire to secure by Letters Patent, is—

A lock nut consisting of the combination of a bolt a nut having a transverse groove formed in its front face, a wedge formed with a series of impinging teeth on the face nearest the thread of the bolt, resting and sliding in said groove, means for retaining the wedge in the groove, consisting of the elongated slot $c$ and pin $b^2$, and a spring D pressing against said wedge to cause the teeth to impinge against the screw-thread, as set forth and described.

In testimony whereof I have hereunto set my hand this 22d day of July, 1895.

AUGUSTUS P. CRAIG.

Witnesses:
SAMUEL J. TAYLOR,
T. E. DONNELLY.